E. H. WINTERNHEIMER.
TRACE FASTENING.
APPLICATION FILED JUNE 6, 1918.
1,293,282.
Patented Feb. 4, 1919.
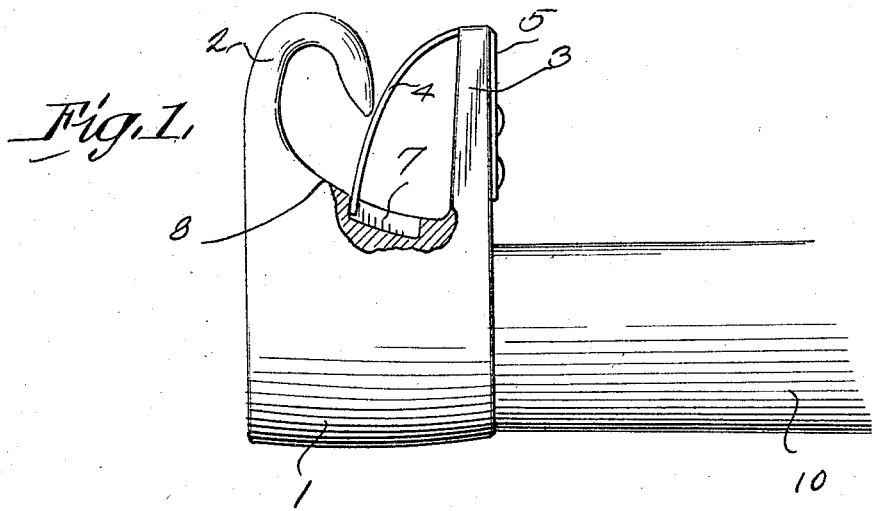
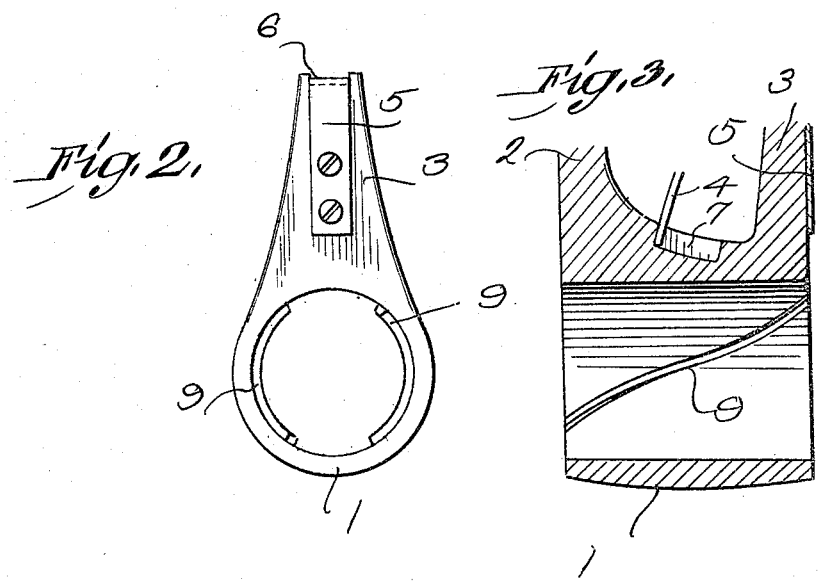
INVENTOR
Edward H. Winternheimer,
WITNESSES
BY
ATTORNEY

UNITED STATES PATENT OFFICE.

EDWARD H. WINTERNHEIMER, OF EVANSVILLE, INDIANA.

TRACE-FASTENING.

1,293,282.　　　　　Specification of Letters Patent.　　Patented Feb. 4, 1919.

Application filed June 6, 1918. Serial No. 238,574.

*To all whom it may concern:*

Be it known that I, EDWARD H. WINTERNHEIMER, a citizen of the United States, residing at Evansville, in the county of Vanderburg and State of Indiana, have invented certain new and useful Improvements in Trace-Fastenings, of which the following is a specification.

The usual fastener commonly provided at the ends of swingle and double trees is objectionable since it admits of the trace becoming detached, is detrimental to the tail of the animal since it catches the hairs and pulls the same or breaks them off, and moreover, frequently becomes detached.

The present invention provides a fastening which when applied to a swingle or double tree is not liable to become disconnected therefrom, and which prevent the casual unhooking or unloosening of the trace, and which above all prevents pulling out of hairs of the horse's tail or breaking off the hairs.

A further purpose of the invention is the provision of a trace fastening of the character herein specified which does not project from the end of the swingle or double tree in a way to become disabled by the animal treading thereon, or by having the same catch into an object in the event of the swingle tree dragging along the ground.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawing:

Figure 1 is a plan view of a trace fastening embodying the invention, showing the same applied to the end of a swingle tree and having a portion broken away, Fig. 2 is an end view of the fastening, and Fig. 3 is a central longitudinal section of the fastening.

Corresponding and like parts are referred to in the following description and indicated in the several views of the drawing by like reference characters.

The fastening comprises a sleeve 1, which is provided at one end with a fastening hook 2 and at its opposite end with an offstanding stud 3. The hook 2 and stud 3 project from the same side of the sleeve 1 and are disposed in the same plane.

The open side of the hook 2 faces inward and is closed by means of a spring 4, which has an end portion bent as indicated at 5 and extending along the outer side of the stud 3 and fastened thereto. The outer end of the stud 3 is notched as shown most clearly at 6 in Fig. 2, and the spring is seated in said notch. The end of the spring 4 operates in a recess 7 formed in a side of the sleeve between the hook 2 and stud 3. In this manner the end of the spring 4 is braced and is limited in its movement. The wall 8 formed between the base of the hook 2 and the base of the stud 3 slopes or inclines inwardly and downwardly from the hook, the purpose being to prevent possible disengagement of the trace from the hook. The spring 4 is sufficiently stout to hold the end of the trace within the confines of the hook 2, so that when the trace is subjected to a pulling strain it will be in engagement with the hook.

The sleeve 1 is provided upon the inner walls of its opening with ribs 9 which have a spiral arrangement to form in effect thread sections which make positive engagement with the swingle tree or double tree 10 to which the fastening is applied. The ribs 9 bite into the sides of the swingle tree 10 and prevent casual disengagement of the fastening therefrom. When placing the fastening in position the same is pressed upon and given a partial rotation, thereby assisting the ribs 9 in drawing the sleeve upon the swingle tree as will be readily understood. When the trace (not shown) is coupled to the fastening the ring or link at the end thereof is passed between the bill of the hook 2 and the spring 4, and is engaged with the hook, the spring 4 closing the entrance to the hook and preventing casual disengagement of the trace therefrom, even though said trace should become slack. It is also noted that the fastening is of minimum length and has no part projecting outward from the end of the swingle tree to become trodden upon or to engage with any object in the event of the swingle tree dragging on the ground. Moreover, there is no projecting part to engage with and pull the hairs from the tail of the animal or break off the ends of the hairs, thereby shortening the tail of the horse which is objectionable for many reasons.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims:

Having thus fully described my invention, what I claim as new and desire to secure by Letters Patent is:—

1. A trace fastening of the character specified, comprising a sleeve, a laterally extending hook at one end of the sleeve, a spring connected with the opposite end of the sleeve and closing the entrance to the hook, said spring having its free end engaging positively with the sleeve and embraced thereby.

2. A trace fastening of the character set forth, comprising a sleeve having a recess in a side thereof, and having laterally extending hook and stud in line with the recess, and a spring connected with the stud and closing the entrance to the hook, and having its free end extending into the said recess.

3. A fastening of the character specified, comprising a sleeve having a recess in a side, a laterally extending hook at one end of the sleeve, a stud projecting laterally from the opposite end of the sleeve and notched in its outer end, and a spring attached to the outer side of the stud and seated in the notch in the outer end thereof and closing the opening to the hook and having its free end entering the recess formed in the side of the sleeve.

In testimony whereof I affix my signature in presence of two witnesses.

EDWARD H. WINTERNHEIMER.

Witnesses:
 BEN WINTERNHEIMER,
 SELMA H. WINTERNHEIMER.

Copies of this patent may be obtained for five cents each, by addressing the "Commissioner of Patents, Washington, D. C."